March 8, 1949.  P. MARTINEAU  2,463,706
GAFF HOOK

Filed July 26, 1947  2 Sheets-Sheet 1

INVENTOR.
Philip Martineau
BY
Pearson & Pearson
ATTORNEYS

March 8, 1949. P. MARTINEAU 2,463,706
GAFF HOOK
Filed July 26, 1947 2 Sheets-Sheet 2
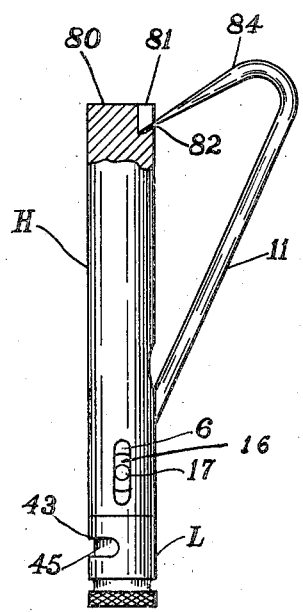
Fig. 11
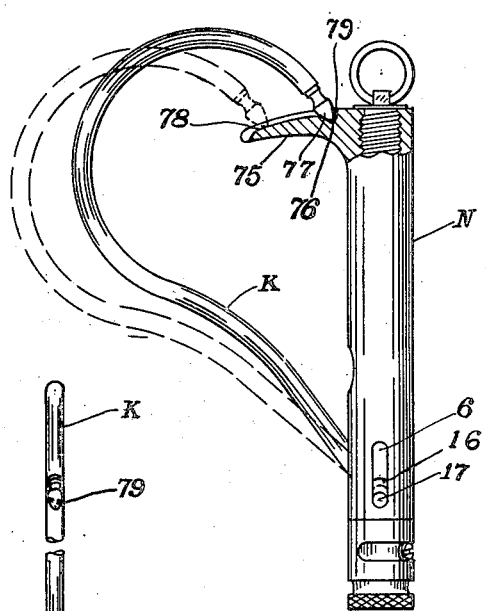
Fig. 12
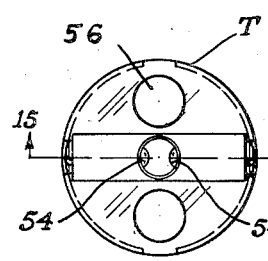
Fig. 14
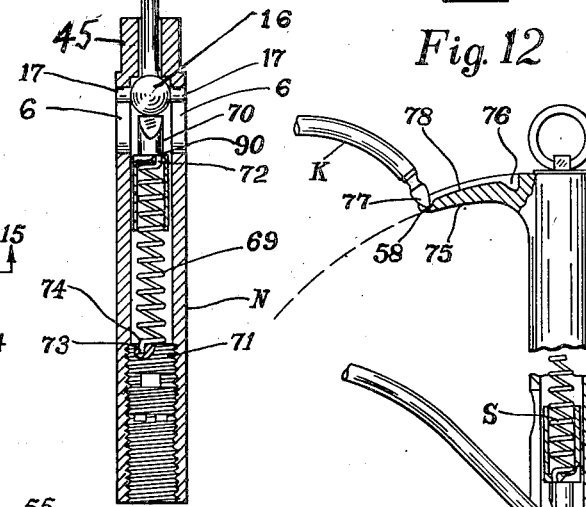
Fig. 13    Fig. 16
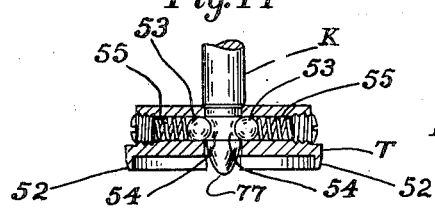
Fig. 15
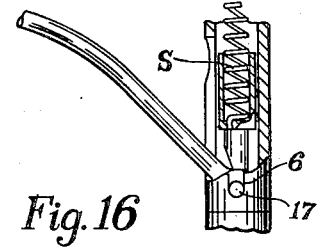
INVENTOR.
Philip Martineau
BY
Pearson & Pearson
ATTORNEYS Patented Mar. 8, 1949

2,463,706

UNITED STATES PATENT OFFICE 2,463,706

GAFF HOOK

Philip Martineau, Lawrence, Mass.

Application July 26, 1947, Serial No. 763,808

8 Claims. (Cl. 294—26)

This invention relates particularly to folding gaff hooks for fishing but may be used for other purposes such as for the handling of wooden boxes, paper cartons and for some other purposes.

In certain kinds of fishing, the right hand manipulates the rod and line until a fish is caught and brought near the angler, either standing in the water or in a boat, and then it is necessary for small fish to use a landing net but with larger fish a gaff hook is necessary.

One of the principal advantages of this device is that it can be carried in the pocket or hung on a hook at a belt with the point of the gaff hook housed in a recess in a handle butt, and with the left hand it can be so manipulated that the hook is released, thrown into operative position and locked in that position all with one hand.

It is also so made that a long extension handle can be screwed into it, in which case it may be necessary to use both hands to release the point of the hook.

It may also be used for pruning, with or without such a handle, with a modified type of hook having V-shaped cutting edges.

The main idea is the combination of a pivotal hook member with a shank ending in a hook, with a handle member which I will describe as having a butt end in which the point of the hook can be housed when not in use, and a pivot end from which the hook can be extended, held extended and then definitely locked; or moved on its pivot to house its hook at the butt end of the handle member.

I prefer to use a central passage extending from the butt end through the pivot end of the handle and for convenience, I will call the part near the pivot end, the shank hole, as it preferably nearly fits the shank, and the part between this and the butt, the pivot body hole, in which a pivot body attached to the pivot end of the hook member shank can slide.

There is also an open shank guide slot which extends into the central passage at the pivot body hole and at the shank hole and then out the pivot end. Preferably there is an assembling hole at the inner end of the shank guide slot for convenience in assembling and disassembling.

There is a hook point recess at the butt end of the handle member which may be in a nose shaped extension or may be merely in the butt end and there is also preferably an extension handle hole at the butt end of the central passage having inside threads for use, when desired, with an extension handle.

In the drawings

Fig. 11 is a view similar to Fig. 2 of a modification of the handle without showing the hand.

Fig. 12 is a view similar to Fig. 11, of a modified form of the handle member and of the hook member.

Fig. 13 is a longitudinal sectional view similar to Fig. 4 of the construction shown in Fig. 12, but with the hook member extended in operative position, the locking member being removed and a preferred form of pressure spring being shown.

Fig. 14 is a top view of a metal cap in place of a rubber cap for the point or tip of a hook member and Fig. 15 is a sectional view as on the line 15—15 of Fig. 14, but showing also the tip or point of a hook member.

Fig. 16 is a detail view similar to Fig. 12, but showing the hook member and its pivot pins in a different position from the full line or dotted line position of the device shown in Fig. 12.

Figure 1:
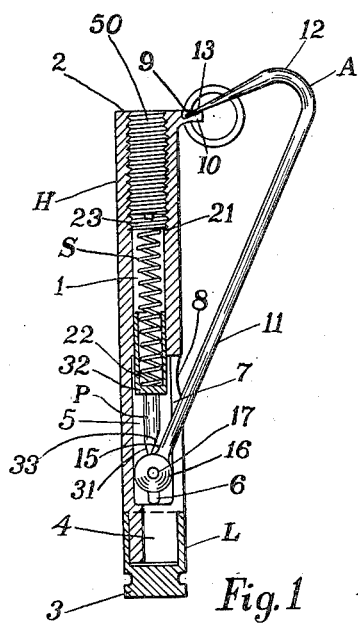
Fig. 1 is a longitudinal sectional view of a form of the device which is particularly useful when used as a fish gaff, showing the point of the hook member housed and with an attaching or carrying ring.

In the drawings H indicates the handle member and is shown as having a central passage 1, a butt end 2, and a pivot end 3.

This central passage 1 extends from the butt end to the pivot end and at the pivot end has a reduced part 4 which I will call the shank hole and, near but not extending out the pivot end, has a pivot body hole 5.

There are also two lengthwise pivot pin slots 6, 6, for pivot pins 17, 17, and between them is a shank guide slot 7 of about the width of the thickness of the shank 11 of a pivoted hook member A which is bent around at 12 to form a hook with a point 13 and which at the inner end 15 of shank 11 has a pivot body 16 from which extend the pivot pins 17, 17.

At the end of the shank guide slot 7 is an assembling body hole 8 which is useful for assembling and unassembling the hook member A and the handle member H.

At the butt end 2, as shown, there is a nose 10 in which is a hook point recess 9 and at that end of the central passage is an extension handle hole 50 which is threaded inside to receive the outside threads 51 on an extension handle such as E. The shank 11 is slidable in a shank hole 4 and at the inner end 15 its pivot body 16, which may preferably be in the form of a globe or cylinder, is slidable in the pivot body hole 5 and is provided with the pivot pins 17 and 17 which are sliable in the pivot pin slots 6, 6.

Pivot body 16 should be smaller in diameter than body hole 8, so that it can be passed through that hole in assembling the device and in taking it apart.

As shown, there is a pressure pin P slidable in the pivot body hole 5 and having a chisel shaped end 31 which engages the pivot body 16 a little off centre and a butt end 32 which is in engagement with one end 22 of a compression spring S, which, as shown, engages at its other end 21 a spring screw 23 whereby, when the hook member A with its shank 11 and hook is straightened out and its point 13 is released from the recess 9, it is held in position in extension of the handle and of the central passage until a turnable locking sleeve L can lock it in extended position.

By unscrewing screw 23, spring S and pin P can be removed, end 15 and body 16 and shank 11 of member A can be pushed towards the butt end 2, the member A turned and pivot body 16 with pins 17, 17, slipped out through body hole 8 and guide slot 7.

A locking sleeve L is at the pivot end of the handle H and through it is an extension 40 of the shank hole 4 and 42 of the shank guide slot 7. It also has a circumferential slot 43 through which a holding screw 44 passes into a neck 45 which is formed at the pivot end 3, as shown. This slot and screw prevent the locking sleeve from coming off and also limit its movements to the length of the circumferential slot 43.

When not in use or when about to release the point 13 from recess 9, lock L is turned so that extension slot 42 registers with slot 7. Slot 43 and screw 44 are preferably so located that screw 44 stops the turning of locking sleeve L when slots 42 and 7 register.

Figure 3:
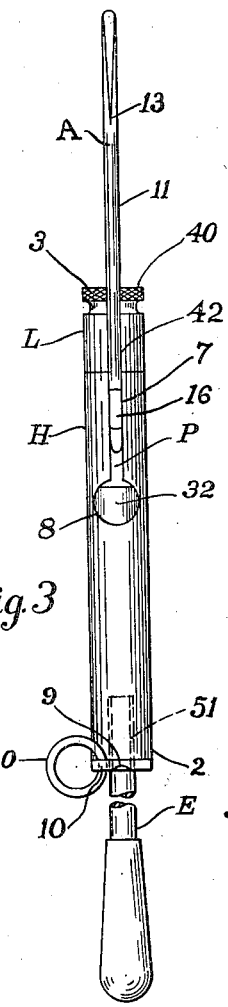
Fig. 3 is an elevational view showing the position of the shank of the hook member with relation to the handle member just before being locked in operative position. This view also shows an extension handle which can be used where a longer reach is desirable.
Figure 2:
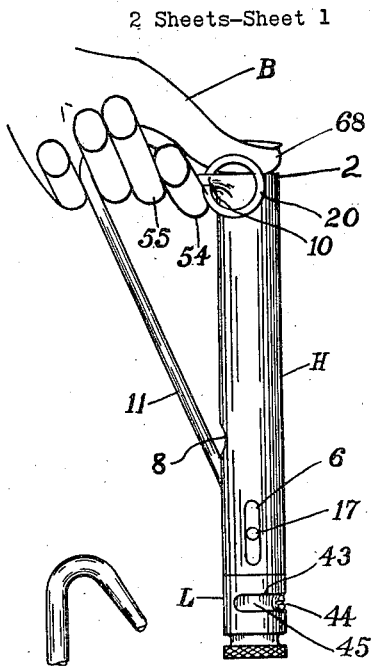
Fig. 2 is an elevational view of the device shown in Fig. 1, from the opposite side, also showing a hand in place ready to release the point of the hook member before swinging the handle member around into alignment with the shank of the hook member ready for locking and for use.
Figure 4:
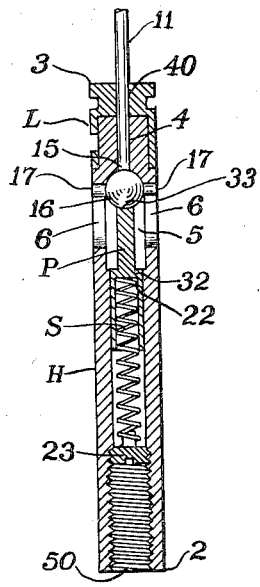
Fig. 4 is a longitudinal sectional view of the device shown in Fig. 1 but taken at an angle ninety degrees from what is shown in that view and with the hook member in the extended position shown in Fig. 3.

Figs. 1 and 2 show the hook member A housed for carrying and Figs. 3 and 4 show it extended for use. It can be unhoused and extended using only one hand while the other hand is free or is holding a fish pole.

As shown in Fig. 2, the hand B which is free can press its thumb 68 on the butt end 2 with fingers 54 and 55 around hook 12 to release hook member A and then by a throwing motion of the hand overcome the resistance of holding pin P, causing shank 11 to swing on pivot pins 17, 17 through guide slots 7 and 42 until it is in extension of central passage 1, thus allowing lock L to be turned by the thumb or fingers to lock it in operating position.

I may provide a ring 20 in nose 10 for hanging on a belt hook or I may use a hook in place of ring 20 to hook the housed device on to a belt in convenient position to reach.

The pressure pin such as P, the straight shank such as 11 of a hook member A and the pressure spring such as S should all be in a straight line substantially along the axis of the handle H.

However as the form of hook desirable in a fish gaff is substantially as shown in the drawings, in order to house its point 13 in a recess such as 9 of a handle H, its straight shank 11 must extend out at an angle of roughly twenty or thirty degrees as shown in Fig. 1.

Figure 5:
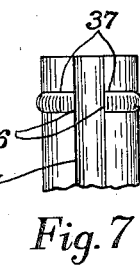
Fig. 5 is a detail view of the pivot body for the hook member and the end of the pressure pin showing the bevel or slant of the pressure pin and its relation to the axis of the shank of the hook member.

For that reason, I find it convenient to make the end 31 of a pin such as P with a beveled cut away part at 34 and a crosswise curved cut away part at 33 so that when housed, as shown in Fig. 1, and more in detail in Fig. 5, it can extend out at an angle, with its point 13 safely protected while the pressure spring S and the pressure pin P hold it resiliently in that position until pulled out as by the hand B as shown in Fig. 2.

The idea is to keep the hook member with its pivot pins pressed towards the pivot end when in use and locked, and to keep the point of the hook in its recess and under pressure, when housed.

Figures 6, 7, 8, 9:
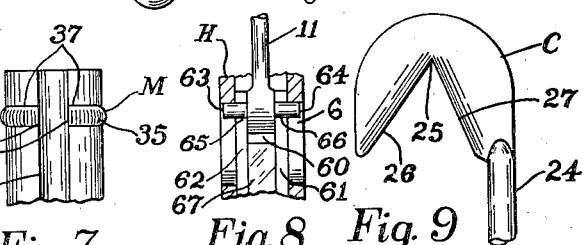
Fig. 6 is a view similar to Fig. 5 of a modification of the pressure pin.
Fig. 7 is a detail showing another type of hook member locking device.
Fig. 8 is a view of the modification of the pin shown as from the right of Fig. 6.
Fig. 9 is a detail showing a modified type of hook member suitable for use in pruning.

As shown in Fig. 6, however I may use a pressure pin such as R which can be bifurcated as with two legs 61 and 62 with a space or slot 60 between them which is of a width to allow the shank 11 of the hook member A to slip in between them when the point of the gaff is housed. In this same view, the pivot body end F of the shank is provided with ears 63 and 64 which, if desired, may take the place of the pivot pins such as 17, 17. These ears or pivot pins are pivotal in recesses 65 and 66 in the legs 61 and 62. As shown there is a sloping web 67 which fills up part of slot 60. See also Fig. 8. Body end F is not globular.

Instead of a lock in the form of a collar such as L, as shown in Fig. 7, I can use a lock member such as M which is a ring 35 broken at 36 to register with the shank guide slot 7 and turnable in an annular slot 37 at the pivot end of a handle member.

As shown in Fig. 9, for a pruning hook, I can use a hook member C with a shank 24 and a modified cutting hook 25 which includes a V-shaped cutter with oppositely disposed cutting faces 26 and 27. Such a pruning hook can be used either with or without an extension handle for cutting the smaller branches of trees, bushes, etc.

Figure 10:
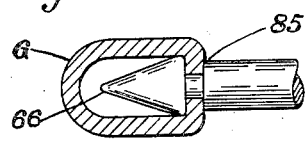
Fig. 10 is a detail view showing a rubber cap for the tip or point of a hook member.

My device can also be used in place of the usual T-shaped packing case hooks with wooden boxes or if it is to be used with paper board cartons, I find it convenient to use a cap such as G over the point 66 which may be recessed at 85, to prevent the cap G from slipping off, as shown in Fig. 10.

An all metal cap T for the same purpose is shown in Figs. 14 and 15.

In Fig. 11 is shown a construction where there is no nose or projection from the butt 80 of the handle but merely a recess 81 for the point 82 of a hook member 84. The recess preferably extends axially from the end to allow for the action of the pressure or compression spring.

Figs. 12 and 16 show a type of construction which is preferable where the device is to be used as a cant hook for handling either wooden boxes or cases and particularly with a special type of cap T instead of the rubber type G for use when handling cartons of corrugated paper or similar material.

In this case the hook member indicated by K has a larger opening and is on more of a curve than the one shown at A and the handle member N has a very long nose 75 in which is a recess 76 to house the point 77 of the hook K. There is also a runway 78 which is on a curved and rising slope whereby, when the point 79 of the hook engages the part 58 at the free end of the runway at the end of the nose 75, by squeezing the hook member K and handle member N, point 77 runs up easily until it drops into the hook point housing recess 76 at the inner end of this runway 78 which at 58 slopes sharply toward the pivot end, the parts being so arranged that when the hook member K does not engage the nose 75, as shown diagrammatically in Fig. 16, the pivot pins 17, 17 will be at the end of the pivot pin slots 6, 6, being pushed thereto by the pressure spring S and hook point 77 of hook member K will swing in the arc indicated by the dotted lines in Fig. 16 so that it will strike this part 58. With this arrangement it is not necessary to pull the pivot body end of hook member K towards the butt end of handle member N to house the hook, as by squeezing hook member K and handle member N together with one hand, point 77 will ride up on part 58 to the rest of the runway 78, this moving the pivot pins a short distance towards the butt end until the hook point 77 drops into the hook point recess 76 where it will be held by the force of the pressure spring S and cannot escape except by pulling on the hook member K thus compressing the spring, and then swinging hook member K on its pivot end.

An advantage of having a long nose such as 75 rather than a short nose, as shown in Figs. 1 to 10 or no nose at all as shown in Fig. 11, is that it gives the operator a much better chance to grip the handle, especially where heavy packing cases of various kinds are to be moved rather than relatively light fish, when the device is used strictly as a gaff for fishing.

Figs. 14 and 15 show a metal cap T with a plurality of curved teeth 52 which project from its rim. Cap T can be pushed or snapped on or off the point 77 of the hook K as the balls 53, pressed by springs 55, cause them to enter the annular recess 54 or allow the cap T to be removed with a very little pressure. This is the preferred type of protecting cap for use with paper cartons.

I find it convenient to have two holes 56, 56, in a metal cap such as T so that when not attached to the point 77 of the hook, the hook can be passed through a hole and then its point can be housed or locked and cap T will stay with the rest of the hook and handle.

Fig. 13 shows a preferred form of the relation between the pressure pin such as 70, a screw plug 71 and a spring 69, there being a small hole 99 in the pressure pin 70 to receive the bent end 72 of the spring and a small hole 73 in the plug 71 to receive the other end of the spring which is bent at 74. These bent ends 72 and 74 prevent the pressure pin from turning while the pins 17, entering the pivot pin guide slots 6, 6, prevent the hook and shank from turning while the ears 63 and 64 of the construction shown in Figs. 6 and 8, not only prevent the hook and its shank from turning but also prevent the plug from turning thus making it unnecessary for a spring such as S to have bent ends to keep the parts from turning.

I claim:

1. In a folding gaff hook; a handle member having a butt end, a nose with a hook point recess at the butt end, a pivot end and a central passage between them including a pivot body hole and a shank hole extending out the pivot end, parallel lengthwise pivot pin slots, a shank guide slot between them extending into the pivot body hole and into the shank hole, there being an assembling hole at the inner end of the shank guide slot, and an extension handle hole with inside threads; a hook member including a shank slidable in the shank hole, having a hook at its outer end and a curved pivot body at its inner end slidable in the pivot body hole and with projecting pivot pins which enter the pivot pin slots; a compression spring in the pivot body hole; a pressure pin slidable in the pivot body hole engaging at one end the pivot body off its center and at its other end engaging the compression spring; and a turnable locking sleeve at the pivot end of the handle with an extension of the longitudinal shank guide slot passing through it lengthwise and a circumferential holding screw slot, and a holding screw which passes through the holding screw slot into the handle member; and an extension handle engaging the handle hole inside threads.

2. In a folding gaff hook; a handle member having a butt end, a nose with a hook point recess at the butt end, a pivot end and a central passage between them including a pivot body hole and a shank hole extending out the pivot end, parallel lengthwise pivot pin slots, a shank guide slot between them extending into the pivot body hole and into the shank hole, there being an assembling hole at the inner end of the shank guide slot; a hook member including a shank slidable in the shank hole, having a hook at its outer end and a curved pivot body at its inner end slidable in the pivot body hole and with projecting pivot pins which enter the pivot pin slots; a compression spring in the pivot body hole; a pressure pin slidable in the pivot body hole engaging at one end the pivot body off its center and at its other end engaging the compression spring; and a turnable locking sleeve at the pivot end of the handle with an extension of the longitudinal shank guide slot passing through it lengthwise and a circumferential holding screw slot, and a holding screw which passes through the holding screw slot into the handle member.

3. In a folding gaff hook; a handle member having a butt end, a hook point recess at the butt end, a pivot end and a central passage between them including a pivot body hole and a shank hole extending out the pivot end, parallel lengthwise pivot pin slots, a shank guide slot between them extending into the pivot body hole and into the shank hole; a hook member including a shank slidable in the shank hole, having a hook at its outer end and a pivot body at its inner end slidable in the pivot body hole and with projecting pivot pins which enter the pivot pin slots; a compression spring in the pivot body hole; a pressure pin slidable in the pivot body hole engaging at one end the pivot body and at its other end engaging the compression spring; and a turnable locking sleeve at the pivot end of the handle with an extension of the longitudinal shank guide slot passing through it lengthwise and a circumferential holding screw slot, and a holding screw which passes through the holding screw slot into the handle member.

4. In a folding gaff hook; a handle member having a butt end, a hook point recess at the butt end, a pivot end and a central passage between them including a pivot body hole and a shank hole extending out the pivot end, parallel lengthwise pivot pin slots, a shank guide slot between them extending into the pivot body hole and into the shank hole; a hook member including a shank slidable in the shank hole, having a hook at its outer end and a pivot body at its inner end slidable in the pivot body hole and with projecting pivot pins which enter the pivot pin slots; a compression spring in the pivot body hole; a pressure pin slidable in the pivot body hole engaging at one end the pivot body and at its other end engaging the compression spring; and a turnable locking sleeve at the pivot end of the handle with an extension of the longitudinal shank guide slot passing through it lengthwise.

5. In a folding gaff hook; a handle member having a butt end, a hook point recess at the butt end, a pivot end and a central passage between them including a pivot body hole and a shank hole extending out the pivot end, parallel lengthwise pivot pin slots, a shank guide slot between them extending into the pivot body hole and into the shank hole; a hook member including a shank slidable in the shank hole, having a hook at its outer end and a pivot body at its inner end slidable in the pivot body hole and with projecting pivot pins which enter the pivot pin slots; a compression spring in the pivot body hole; a pressure pin slidable in the pivot body hole engaging at one end the pivot body and at its other end engaging the compression spring; and means to lock the hook member with its shank in extension of the handle.

6. In a folding hook; a handle member having a butt end, a nose with a runway and a hook point recess at the butt end, the runway at its other end having a hook point receiving portion, a pivot end and a central passage between them and including a pivot body hole and a shank hole extending out the pivot end, parallel lengthwise pivot pin slots, a shank guide slot between them extending into the pivot body hole and into the shank hole; a hook member including a shank slidable in the shank hole, having a hook at its outer end and a pivot body at its inner end slidable in the pivot body hole and with projecting pivot pins which enter the pivot pin slots; a pressure spring in the pivot body hole; a pressure pin slidable in the pivot body hole engaging at one end the pivot body and at its other end engaging the pressure spring; and means to lock the hook member with its shank in extension of the handle; the ends of the pivot pin slots and the butt end being so positioned that the tip of the point of the hook member will enter the receiving part of the runway in the nose when the hook member is swung on the pivot pins.

7. In a folding hook; a handle member having a butt end, a hook point recess at the butt end, a pivot end and a central passage between them including a pivot body hole and a shank hole extending out the pivot end, parallel lengthwise pivot pin slots, a shank guide slot between them extending into the pivot body hole and into the shank hole; a hook member including a shank slidable in the shank hole, having a hook at its outer end with a point and an annular slot near it and a pivot body at its inner end slidable in the pivot body hole and with projecting pivot pins which enter the pivot pin slots; a compression spring in the pivot body hole; a pressure pin slidable in the pivot body hole engaging at one end the pivot body and at its other end engaging the compression spring; and means to lock the hook member with its shank in extension of the handle; together with a removable cap of disk shape including a middle hole and other holes to receive the shank of the hook member, rim teeth on one face, and a spring friction latch to engage the annular slot near the hook point, whereby the cap can be attached and detached.

8. In a folding hook; a handle member; a hook member including a shank pivoted at one end to the handle member and having a hook at its outer end with a point and an annular slot near it; and means to lock the hook member with its shank in extension of the handle; together with a removable cap of disk shape including a middle hole, rim teeth on one face and a spring friction latch to engage the annular slot near the hook point, whereby the cap can be attached and detached.

PHILIP MARTINEAU.

No references cited.